United States Patent [19]

Hazeltine et al.

[11] Patent Number: 4,643,575
[45] Date of Patent: Feb. 17, 1987

[54] FIZEAU INTERFEROMETER

[75] Inventors: Michael B. Hazeltine, Framingham; W. Michael Lipchak, Jr., Sterling Junction, both of Mass.

[73] Assignee: Raytheon Company, Lexington, Mass.

[21] Appl. No.: 647,303

[22] Filed: Sep. 4, 1984

[51] Int. Cl.[4] ............................ G01B 9/02; G01P 3/36
[52] U.S. Cl. ...................................... 356/351; 356/28.5
[58] Field of Search ...................... 356/28.5, 345, 351, 356/4.5, 5

[56] References Cited

U.S. PATENT DOCUMENTS

| | | | |
|---|---|---|---|
| 3,507,596 | 4/1970 | Bliek et al. | 356/349 |
| 3,656,853 | 4/1972 | Bagley et al. | 356/351 X |
| 3,856,402 | 12/1974 | Low et al. | 356/5 |

FOREIGN PATENT DOCUMENTS 495531  12/1975  U.S.S.R. .............................. 356/28.5

OTHER PUBLICATIONS

Pomeroy et al., "Performance Study of an Acousto-Optic Frequency Shifter in a $CO_2$ Laser Velocimeter," J. Phys. E. Sci. Instrum., vol. 13, No. 9, Sep. 1980, pp. 982–985.

Primary Examiner—Vincent P. McGraw
Assistant Examiner—S. A. Turner
Attorney, Agent, or Firm—Richard M. Sharkansky; Walter F. Dawson; Peter J. Devlin

[57] ABSTRACT

An interferometer wherein detected local oscillator beam power is variable without varying detected target-reflected return beam power. A P-polarized beam of energy is produced along a predetermined path. First and second waveplates are serially disposed in the predetermined path. Also included are a beamsplitter disposed in the path between the first and second waveplates, and a polarization analyzer disposed in the path between the beam producing means and the first waveplate. A first portion of the P-polarized beam couples through the first waveplate, the beamsplitter and the second waveplate, and is transmitted to a target, the first and second waveplates altering the polarization of the transmitted beam to circular polarization. A circularly polarized portion of the transmitted beam reflected by the target couples through the second waveplate, the beamsplitter and the first waveplate and is incident on the polarization analyzer, the first and second waveplates altering the polarization of such beam to substantially entirely S-polarization. A second portion of the P-polarized beam couples through the first waveplate, reflects from the beamsplitter, recouples through the first waveplate and is incident on the polarization analyzer, the first waveplate changing the polarization of such beam to both P- and S-polarization components. The polarization analyzer directs to a detector for heterodyning substantially only the S-polarization component of the second beam portion and the S-polarization component of the substantially entirely S-polarized target reflected beam.

15 Claims, 1 Drawing Figure

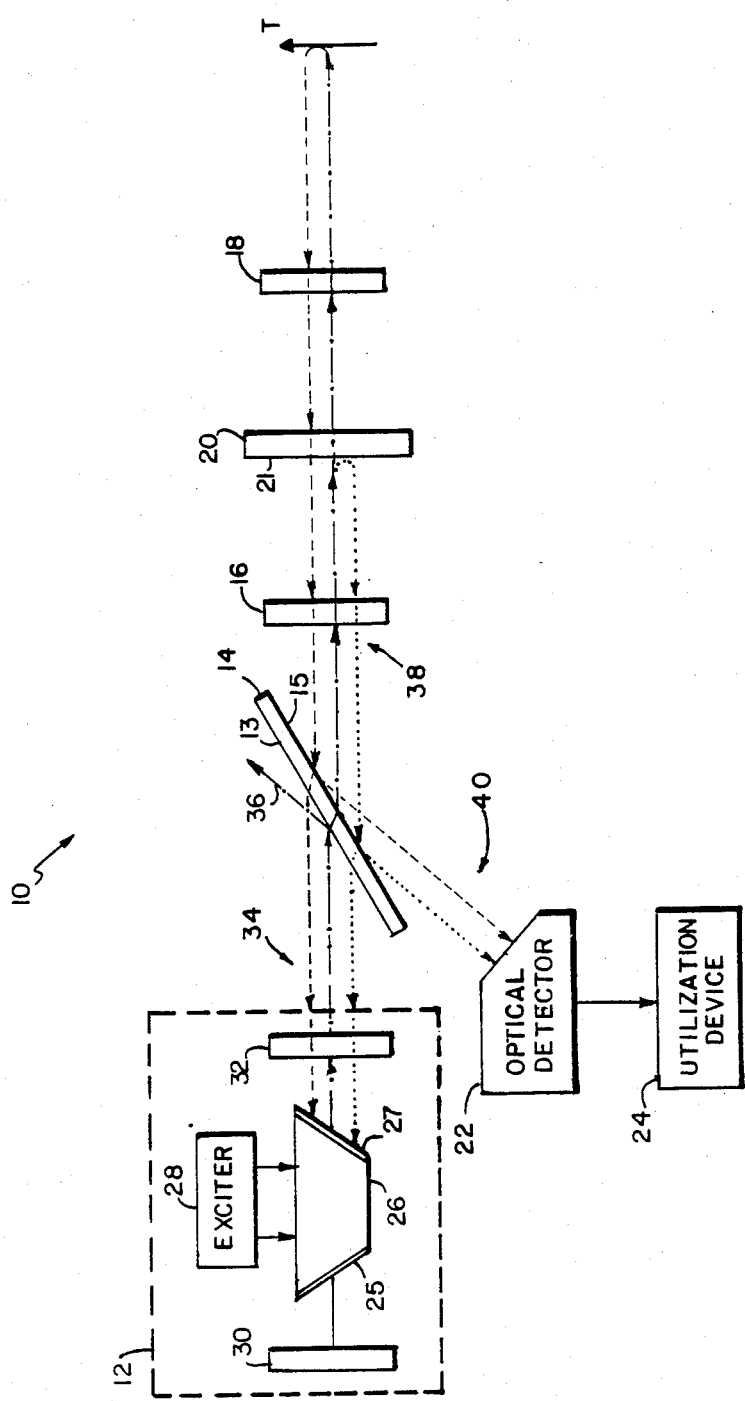

FIZEAU INTERFEROMETER

BACKGROUND OF THE INVENTION

This invention relates generally to the art of laser beam interferometers, and more particularly to Fizeau heterodyne interferometers.

As is known in the art, heterodyne interferometers in general have a wide variety of applications. One such application is in laser doppler velocimeters (LDVs) for radar systems. Heterodyne interferometers of the Mach-Zehnder type have been utilized successfully in laser doppler velocimeters. As is known, the local oscillator (i.e. reference) beam travels along a separate path from the beam transmitted to the target and the target-reflected return beam in a Mach-Zehnder heterodyne interferometer. The target return beam and the reference beam are combined in a recombining beamsplitter and directed onto an optical detector. Such interferometer is thus a relatively large device and hence may be unsuitable for applications wherein size is of primary importance. One possible substitution is the Fizeau heterodyne interferometer, a device wherein the target-reflected return beam, and the local oscillator (i.e. reference) beam travel along a common optical path to an optical detector, thus achieving a compact structure.

In a conventional Fizeau heterodyne interferometer the local oscillator beam power is fixed at approximately the product of the power of the laser beam and the reflectivity of a beamsplitter which reflects the laser beam to produce the local oscillator beam. The operation of the optical detector is a function of the power of the local oscillator beam which illuminates the detector. If the local oscillator beam power is too high the optical detector will not function optimally, resulting in reduced interferometer signal-to-noise ratio and a corresponding marked decrease in LDV performance. Additionally, the optimum operating power may vary from detector to detector. One way of reducing the local oscillator beam power is to utilize a very low reflectivity beamsplitter to reflect the laser beam and produce the local oscillator beam. However, repeatable production of such very low reflectivity beamsplitters is unreliable since the reflectivity thereof typically varies from beamsplitter to beamsplitter. Another method of decreasing local oscillator beam power is to place an optical attenuator in the path of the local oscillator beam. However, since the local oscillator beam travels along a common path with the target reflected return beam in a Fizeau interferometer, the optical attenuator would also weaken the target-reflected return beam, thus reducing the sensitivity of the interferometer.

SUMMARY OF THE INVENTION

In accordance with the present invention apparatus is provided including means for producing a beam of energy along a predetermined path. Means disposed in the predetermined path transmit a first portion of the produced beam to a target and reflect a second portion of the produced beam. Means are further included for directing a target-reflected portion of the transmitted first beam portion and the reflected second beam portion along a common path to a detector with the reflected second beam portion being attenuated along the common path and the target-reflected portion of the transmitted first beam portion being substantially unattenuated along the common path. The directing means may comprise means for polarizing the reflected second beam portion as a pair of polarization components along the common path and for polarizing the target-reflected portion of the transmitted first beam portion as substantially only the second one of the pair of polarization components along the common path. The directing means may further comprise means for selectively coupling to the detector substantially only the second one of the pair of polarization components of the reflected second beam portion and the target-reflected portion of the transmitted first beam portion polarized as the second polarization component.

Such apparatus may be used in an interferometer, with the second one of the pair of polarization components of the reflected second beam portion serving as the local oscillator, or reference, beam for the interferometer. Thus, the apparatus of the present invention provides an interferometer having an attenuated local oscillator beam and an unattenuated target-reflected return beam travelling along a common path to a detector.

In a preferred embodiment of the present invention, means are provided for producing a beam of energy along a predetermined path. First and second waveplates are serially disposed with the beam producing means in the predetermined path, with a beamsplitter being disposed therebetween in the predetermined path. A polarization analyzer is disposed in the predetermined path between the beam producing means and the first waveplate. With such apparatus an interferometer may be provided wherein the produced beam is P-polarized and a first portion of the produced beam couples through the first waveplate, the beamsplitter and the second waveplate, and wherein the first waveplate and the second waveplate alter the polarization of the first portion of the produced beam coupled through the first waveplate, the beamsplitter and the second waveplate to substantially circular polarization. The apparatus is disposed so that a substantially circularly polarized return beam couples through the second waveplate, the beamsplitter and the first waveplate and is incident on the polarization analyzer, the first and second waveplates altering the polarization of the return beam coupled therethrough to substantially S-polarization. The polarization analyzer directs to a detector substantially the entire S-polarized return beam incident thereon. Additionally, a second portion of the P-polarized produced beam couples through the first waveplate, reflects from the beamsplitter and recouples through the first waveplate and is incident on the polarization analyzer, the first waveplate changing the polarization of the second beam portion incident on the polarization analyzer to both P- and S-polarization components. The polarization analyzer directs to the detector substantially only the S-polarization component of the second beam portion incident on the polarization analyzer.

The present invention further provides a method of transmitting a circularly polarized beam of energy to a target. A P-polarized beam of energy is produced and directed along a predetermined path. The polarization of such beam is changed a first predetermined amount to produce an elliptically polarized intermediate beam having S- and P-polarization components. The polarization of the intermediate beam is changed a second predetermined amount to produce a circularly polarized beam, which is then transmitted to the target. Additionally, the polarization of the intermediate beam is changed by the first predetermined amount to produce a reference beam having S- and P-polarization components. Substantially only the S-polarization component of the reference beam is directed to a detector. Therefore, the reference beam is attenuated. Further, the polarization of the circularly polarized beam reflected by the target is changed by the first and second predetermined amounts to produce a substantially entirely S-polarized beam. Substantially only the S-polarized component of such substantially entirely S-polarized beam is directed to the detector. Thus, the target-reflected beam is substantially unattenuated.

BRIEF DESCRIPTION OF THE DRAWING

The foregoing features of the present invention and the advantages thereof may be more fully understood from the following detailed description when read in conjunction with the accompanying FIGURE, which is a schematic and block diagram of the improved interferometer of the present invention.

DESCRIPTION OF THE PREFERRED EMBODIMENT

Referring to the FIGURE, shown is the improved Fizeau interferometer 10 of the present invention used in a laser doppler velocimeter (LDV). Interferometer 10 is shown to comprise laser portion 12, Brewster plate 14, first and second quarter-waveplates 16, 18, and beamsplitter 20. An LDV is constructed using interferometer 10 by including optical detector 22 and utilization device 24, as shown. It is noted that certain conventional appurtenances to such an LDV, for example, power supplies and telescoping arrangements to define or deflect the beam, have been omitted for the sake of clarity. The laser here contemplated is a conventional device comprising laser cell 26 and exciter 28. Laser cell 26 is here a $CO_2$ laser and is operated in the CW mode. Fully reflective mirror 30 and partially transmissive mirror 32 define the optical resonator of laser 12. Brewster plate 14 is likewise a conventional device, utilized as a polarization analyzer in a manner to be described. Thus, a thin-film polarizer or wire-grid polarizer may be substituted therefor. Conventional beamsplitter 20 has front face 21 thereof designed with a predetermined, small reflectivity R of, here, 0.001, for purposes to be described hereinafter. Suffice it to say here, however, that beamsplitter 20 reflects a small portion of the beam incident thereon from laser 12 to provide a local oscillator (LO) beam, such LO beam being heterodyned at optical detector 22 with reflected returns from targets, such as target T. Optical detector 22 is a conventional photovoltaic or photoconductive device which produces electrical output signals in response to optical signals incident thereon. In the present invention, such electrical signals are fed to utilization device 24, wherein such electrical signals are conventionally amplified, filtered and processed.

In operation, exciter 28 responds to conventional actuation to electrically excite the gaseous medium of laser cell 26. Laser transitions occur, thereby activating the optical resonator formed by mirrors 30, 32, and a coherent beam of energy is emitted from laser 12 along optical path 34. The FIGURE depicts this beam as a combination dashed and dotted line. In the preferred embodiment, laser cell 26 is equipped with Brewster windows 25, 27, forcing the beam of energy emitted from laser 12 to be strongly P-polarized. The emitted laser beam is incident on first surface 13 of Brewster plate 14 at the Brewster angle. As stated, Brewster plate 14 functions as a polarization analyzer, here coupling therethrough substantially only P-polarized components of the laser beam incident thereon. Any S-polarized components of such beam are reflected by Brewster plate 14. Thus, any spurious S-polarization present in the laser beam emitted by laser 12 is reflected by Brewster plate 14 along optical path 36 at an angle to optical path 34. Since, as previously stated, Brewster windows 25, 27 strongly P-polarize the laser beam emitted by laser 12, substantially all of such beam is coupled through Brewster plate 14 to optical path 38. It is seen from the FIGURE that optical path 38 is substantially parallel to optical path 34, but displaced therefrom by a small amount due to the passage of the emitted laser beam through Brewster plate 14. The emitted laser beam coupled to optical path 38 passes through first quarter-waveplate 16, beamsplitter 20 and second quarter-waveplate 18 in a manner and for purposes to be described. Briefly, however, such beam after traversing first and second quarter-waveplates 16, 18 and beamsplitter 20 is transmitted towards a target T for reflection back to interferometer 10 along optical path 38. The FIGURE illustrates the transmitted and target reflected beams separately for the sake of clarity, although it is understood that such beams travel coaxially along optical path 38. The target-reflected return beam, represented in the FIGURE by a dashed line, is coupled through second quarter-waveplate 18, beamsplitter 20 and first quarter-waveplate 16 and impinges on second surface 15 of Brewster plate 14 at the Brewster angle. As will be described in detail hereinafter, a predetermined portion of the reflected return beam—the portion which is S-polarized—is reflected by Brewster plate 14 along optical path 40 at an angle to optical path 38 and is incident on optical detector 22. The reflected return beam incident on optical detector 22 contains frequency information relating to the doppler velocity of target T that can be easily retrieved by heterodyning such beam with a local oscillator beam derived from a portion of the laser beam emitted by laser 12. As discussed, the local oscillator beam is here produced by beamsplitter 20. The beam emitted from laser 12, coupled through first quarter-waveplate 16, is incident on front face 21 of beamsplitter 20. A predetermined, small portion of such incident beam is reflected by front face 21 back along optical path 38, through first quarter-waveplate 16, to Brewster plate 14. The beamsplitter-reflected beam is shown as a dotted line in the FIGURE. For the sake of clarity, the FIGURE shows the beamsplitter-reflected beam, the beam emitted from laser 12, and the target-reflected return beam separately; however, it is understood that all three beams travel coaxially along optical path 38. As will be described in detail hereinafter, a predetermined portion of the beam reflected by beamsplitter 20 is S-polarized due to the double-passage of the beam through first quarter-waveplate 16. This S-polarized portion is reflected as described by Brewster plate 14 along optical path 40 to optical detector 22 coaxially with the S-polarized portion of the target-reflected return beam, although the FIGURE depicts the two beams separately for convenience. The S-polarized portion of the beamsplitter-reflected beam is utilized as the LO beam for the interferometer.

The crystalline optic axes (i.e., the "fast" and "slow" axes) of a quarter-waveplate are orthogonal to each other. Systems of the prior art utilize a single quarter-waveplate disposed between a polarization analyzer (Brewster plate) and a beamsplitter, the quarter-waveplate being aligned to place its crystal axes at 45° angles to the P-polarization of the beam emitted from the laser through the Brewster plate. The P-polarized beam of energy incident on the quarter-waveplate is coupled therethrough with substantially no loss and is rendered fully circularly polarized. Such beam is incident on the beamsplitter and upon reflection remains fully circularly polarized. The beam then passes through the quarter-waveplate with substantially no loss and has its circular polarization converted fully to S-polarization by the quarter-waveplate. Thus, such beam is substantially entirely reflected by the Brewster plate to the optical detector and becomes the system's LO beam. A little thought reveals that the power of such LO beam essentially is the product of the beam emitted by the laser and the reflectivity of the beamsplitter. It is seen that such power level is basically non-adjustable, save varying laser power or beamsplitter reflectivity. Moreover, for lasers of useful power and beamsplitters having reliably producible reflectivities, the power of the LO beam thus generated is normally an order of magnitude above the optimum operating power (i.e. optical bias) level of the optical detector. Thus, the detector operates inefficiently, resulting in poor LDV signal-to-noise ratio. Further, the optimum optical bias level varies from detector to detector. Thus, replacement of a detector due to breakdown, etc., may result in improved or degraded LDV operation, depending on the optimum optical bias level of the replacement detector compared with that of the previous detector.

The interferometer of the present invention solves these problems by producing an LO (reference) beam having a power level which is not simply the product of the emitted laser beam power and the beamsplitter reflectivity, but is rather attenuated to a predetermined factor thereof selected to be within the optimum operating range of optical detector 22. The power level of such LO beam is also adjustable, allowing replacement detectors to be optically biased within their individual optimum ranges. LO beam power attenuation and adjustment is achieved in the present invention by selectively aligning the crystalline optic axes (i.e., the "fast" and the "slow" axes) of first quarter-waveplate 16 relative to the P-polarization of the beam incident thereon from laser 12 via Brewster plate 14. As discussed, alignment of the crystalline optic axes at 45° angles to the P-polarization of the incident beam produces a beam which is fully S-polarized upon passage through first quarter-waveplate 16, reflection from beamsplitter 20, and repassage through first quarter-waveplate 16. Thus, the entire reflected beam incident on Brewster plate 14 is reflected by Brewster plate 14 along optical path 40 and illuminates optical detector 22, providing maximum LO power. On the other hand, by rotating first quarter-waveplate 16 to align either of its crystalline optic axes with the P-polarization of the emitted beam from laser 12, it is seen that the beam's polarization will be unchanged upon passage through first quarter-waveplate 16. Thus, the portion of the beam that repasses through first quarter-waveplate 16 after reflection by beamsplitter 20 remains substantially fully P-polarized. Hence, practically none of such beam is reflected by Brewster plate 14 along path 40 to optical detector 22; rather, substantially all of such beam is coupled through Brewster plate 14 to laser 12 via optical path 34. Thus, optical detector 22 is illuminated with essentially zero LO power. A little thought therefore reveals that by rotating first quarter-waveplate 16 to place one of its orthogonal crystalline optic axes at a predetermined angle between 0° and 45° relative to the P-polarization of the beam emitted from laser 12, the beam reflected by beamsplitter 20 will comprise both an S-polarized component and a P-polarized component upon repassage through first quarter-waveplate 16. As stated, only the S-polarized component is reflected by Brewster plate 14 along optical path 40 to become the LO beam for optical detector 22. Thus, first quarter-waveplate 16 is rotated to adjust the degree of S-polarization of such beam and thereby selectively attenuate and adjust the power of the LO beam illuminating optical detector 22 to be within the optimum operating power range of the detector.

It is desired that the P-polarized beam emitted by laser 12 be converted to a fully circularly polarized beam before transmission for reflection by a target, such as target T, since the target-reflected return beam incident on Brewster plate 14 will thereby be fully S-polarized and will be substantially entirely directed to optical detector 22 with essentially none of such beam coupled to laser 12 and lost to detector 22. However, as an inherent consequence of aligning the crystalline optic axes of first quarter-waveplate 16 at other than 45° to the incident P-polarization of the beam emitted by laser 12, the beam coupled through first quarter-waveplate 16 and beamsplitter 20 for transmission to target T is elliptically polarized rather than fully circularly polarized. An elliptically polarized beam reflected by target T will not be fully S-polarized upon return through quarter-waveplates 16, 18. Thus, part of such return beam will be coupled to laser 12 rather than to detector 22 by Brewster plate 14. The power of the target-reflected return beam available to detector 22 will thus be reduced, resulting in a corresponding decrease in the maximum range at which the interferometer can detect target T. Thus, in the present invention, second quarter-waveplate 18 is provided having its crystalline optic axes aligned to adjust the elliptical polarization of the beam incident thereon from beamsplitter 20 to be substantially fully circular after passage through second quarter-waveplate 18. Such fully circularly polarized beam, upon reflection from a target, such as target T, is converted to a fully S-polarized beam by quarter-waveplates 16, 18. Thus, substantially all of the target-reflected return beam is directed by Brewster plate 14 to detector 22, with essentially none of such beam lost by being coupled through Brewster plate 14 to laser 12.

The precise angle to which first quarter-waveplate 16 is rotated may be calculated by using the normalized Jones Vector to represent the P-polarized beam emitted by laser 12 and by representing the optical elements of interferometer 10 by Jones Matrices. The use of the Jones Vector and Jones Matrices in determining the effect of optical elements on a polarized wave is aptly discussed in *Introduction to Modern Optics*, by Grant R. Fowles, published by Holt, Reinhart and Winston, Inc., 1975, section 2.5, pages 33–38. The P-polarized beam emitted by laser 12 and coupled through Brewster plate 14 may be represented by the following normalized Jones Vector, and is hereinafter referred to as the input vector:

$$E_i = E_o \begin{bmatrix} 1 \\ 0 \end{bmatrix}$$

The Jones Matrices for the optical components of interest— first quarter-waveplate 16, beamsplitter 20 and second quarter-waveplate 18—are as follows:

$$\text{first quarter-waveplate 16} \quad [A] = \sqrt{\frac{1}{2}} \begin{bmatrix} 1 + i\cos 2a & -i\sin 2a \\ -i\sin 2a & 1 - i\cos 2a \end{bmatrix} \quad (5)$$

$$\text{beamsplitter 20} \quad [B] = \sqrt{R} \begin{bmatrix} -1 & 0 \\ 0 & -1 \end{bmatrix}$$

$$\text{second quarter-waveplate 18} \quad [C] = \sqrt{\frac{1}{2}} \begin{bmatrix} 1 + i\cos 2b & -i\sin 2b \\ -i\sin 2b & 1 - i\cos 2b \end{bmatrix}$$

where R is the reflectivity of front face 21 of beamsplitter 20 (here, 0.001), $i = \sqrt{-1}$, angle "a" is the angle between the P-polarized input vector, $\bar{E}_i$, and a selected one of the crystalline optic axes of first quarter-waveplate 16 (i.e., the rotation angle of first quarter-waveplate 16), and angle "b" is the angle between the P-polarized input vector, $\bar{E}_i$, and a selected one of the crystalline optic axes of second quarter-waveplate 18 (i.e., the rotation angle of second quarter-waveplate 18). For the purposes of these calculations, angles "a" and "b" are each measured with reference to the "slow" axes of first and second quarterwaveplates 16, 18, respectively. Of course, these calculations could also be made with respect to the "fast" axes of first and second quarter-waveplates 16, 18. Additionally, target T may be considered as having unit reflectivity, thus having the following Jones Matrix:

$$\text{Target } T [D] = \begin{bmatrix} -1 & 0 \\ 0 & -1 \end{bmatrix}$$

Using the above Jones Vector and Matrices representations, it is seen that the beam emitted by laser 12, after a first transit through first quarter-waveplate 16, reflection from front face 21 of beamsplitter 20, and a second transit through first quarter-waveplate 16, is converted to a beam having the following Jones Vector representation:

$$\bar{E}_{BR} = [A] [B] [A] \bar{E}_i$$

$$\bar{E}_{BR} = \sqrt{\frac{1}{2}} \begin{bmatrix} 1 + i\cos 2a & -i\sin 2a \\ -i\sin 2a & 1 - i\cos 2a \end{bmatrix} \sqrt{R} \begin{bmatrix} -1 & 0 \\ 0 & -1 \end{bmatrix} \sqrt{\frac{1}{2}} \begin{bmatrix} 1 + i\cos 2a & -i\sin 2a \\ -i\sin 2a & 1 - i\cos 2a \end{bmatrix} E_o \begin{bmatrix} 1 \\ 0 \end{bmatrix}$$

Using basic matrix calculus, the above expression for $\bar{E}_{BR}$ is reduced to:

$$E_{BR} = i\sqrt{R} E_o \begin{bmatrix} -\cos 2a \\ \sin 2a \end{bmatrix} \quad (1)$$

where $-\cos 2a$ represents the portion of $\bar{E}_{BR}$ which is P-polarized, and $\sin 2a$ denotes the S-polarized component of $\bar{E}_{BR}$.

As is known, the power carried by a wave can be expressed as the vector representation of the wave multiplied by the complex conjugate of such vector representation. Thus, the power of wave $\bar{E}_{BR}$ is:

$$\bar{P}_{BR} = \bar{E}_{BR} \bar{E}_{BR}^*$$

$$\bar{P}_{BR} = i\sqrt{R} E_o \begin{bmatrix} -\cos 2a \\ \sin 2a \end{bmatrix} (-i) \sqrt{R} E_o \begin{bmatrix} -\cos 2a \\ \sin 2a \end{bmatrix}$$

$$\bar{P}_{BR} = E_o^2 R \begin{bmatrix} \cos^2 2a \\ \sin^2 2a \end{bmatrix}$$

Since the square of the wave amplitude, $E_o^2$, is proportional to the power of the beam of energy emitted by laser 12 and coupled through Brewster plate 14, the above equation may be expressed as:

$$\bar{P}_{BR} \approx P_o R \begin{bmatrix} \cos^2 2a \\ \sin^2 2a \end{bmatrix} \quad (2)$$

where $P_o$ is the output power of laser 12. It is noted that beam $\bar{P}_{BR}$ has a P-polarized power component, $\bar{P}_{BRP}$, and an S-polarized power component, $\bar{P}_{BRS}$, as follows:

$$P_{BRP} \approx P_o R \cos^2 2a \quad (3)$$

$$P_{BRS} \approx P_o R \sin^2 2a \quad (4)$$

As previously discussed, the beam represented as $\bar{P}_R$ is incident on second surface 15 of Brewster plate 14 at the Brewster angle. Thus, substantially the entire P-polarized component, $\bar{P}_{BRP}$, of beam $\bar{P}_{BR}$ is transmitted through Brewster plate 14 along optical path 34 and coupled into laser 12. Such beam component is shown separately from the beam emitted by laser 12. It is understood, however, that the two beams travel coaxially along optical path 34. The S-polarized component, $\bar{P}_{BRS}$, of beam $\bar{P}_{BR}$ is reflected by Brewster plate 14 along optical path 40 to optical detector 22 and becomes the LO beam for the interferometer. Thus, equation (4) can be expressed as:

$$P_{BRS} \approx P_o R \sin^2 2a \approx P_{LO} \quad (4a)$$

It is noted here that Brewster plate 14 is not an ideal device. Thus, a small portion, such as 1%, of P-polarized component $\bar{P}_{BRP}$ will be reflected by Brewster plate 14 to optical detector 22, thereby slightly increasing LO beam power. As will be shown, this causes a slight degradation in the system's signal-to-noise ratio. However, for purposes of these calculations, this unwanted P-polarization reflection will be ignored. With Equation 4a in mind, a little thought reveals that the power of the LO beam, $P_{LO}$, is essentially determined by the output power of laser 12, the reflectivity of front face 21 of beamsplitter 20, and the sine of the angle between a crystalline optic axis (here, the slow axis) of first quarter-waveplate 16 and the P-polarization of input vector $\bar{E}_i$. LO power may be selectively adjusted by varying such angle, without having to vary either laser output power or beamsplitter reflectivity.

As previously discussed, when the angle "a" of first quarter-waveplate 16 is changed from 45°, the beam coupled through beamsplitter 20 for transmission to target T is elliptically, rather than fully circularly, polarized. Thus, second quarter-waveplate 18 is disposed in optical path 38 to compensate for such elliptical polarization and ensure that a substantially fully circularly polarized beam is transmitted for reflection by target T. It is manifest that rotation angle "b" between a selected one of the crystalline optic axes of second quarter-waveplate 18 (here, the "slow" axis) and the P-polarization of input vector $\bar{E}_i$ be chosen with rotation angle "a" of first quarter-waveplate 16 in mind. Referring to the FIGURE, it is seen that the beam emitted from laser 12 through Brewster plate 14 is coupled through first quarter-waveplate 16, beamsplitter 20 and second quarter-waveplate 18 before striking target T. The portion of such beam reflected by target T traverses second quarter-waveplate 18, beamsplitter 20 and first quarter-waveplate 16 before impinging at the Brewster angle on second surface 15 of Brester plate 14. Assuming beamsplitter 20 has no polarization effects, and neglecting the loss due to the small reflectivity (typically, 0.001) of the beamsplitter, the target-reflected return beam at this point is represented by:

$$\bar{E}_{TR} = [A][C][D][C][A]\bar{E}_i \quad (5)$$

$$\bar{E}_{TR} = \sqrt{\frac{1}{2}} \begin{bmatrix} 1 + i\cos 2a & -i\sin 2a \\ -i\sin 2a & 1 - i\cos 2a \end{bmatrix} \sqrt{\frac{1}{2}} \begin{bmatrix} 1 + i\cos 2b & -i\sin 2b \\ -i\sin 2b & 1 - i\cos 2b \end{bmatrix} \begin{bmatrix} -1 & 0 \\ 0 & -1 \end{bmatrix}$$

$$\sqrt{\frac{1}{2}} \begin{bmatrix} 1 + i\cos 2b & -i\sin 2b \\ -i\sin 2b & 1 - i\cos 2b \end{bmatrix} \sqrt{\frac{1}{2}} \begin{bmatrix} 1 + i\cos 2a & -i\sin 2a \\ -i\sin 2a & 1 - i\cos 2a \end{bmatrix} E_o \begin{bmatrix} 1 \\ 0 \end{bmatrix}$$

$$\bar{E}_{TR} = \frac{-E_o}{2} \begin{bmatrix} 2\cos(2a - 2b) - i\cos 2b + i\cos(4a - 2b) \\ i\sin 2b - i\sin(4a - 2b) \end{bmatrix}$$

The power of the target-reflected return beam at this point is:

$$\bar{P}_{TR} = \bar{E}_{TR}\bar{E}_{TR^*} \quad (6)$$

$$\bar{P}_{TR} = \frac{E_o^2}{4} \begin{bmatrix} 4\cos^2(2a - 2b) + \cos^2(4a - 2b) - 2\cos 2b\cos(4a - 2b) + \cos^2 2b \\ \sin^2 2b - 2\sin 2b\sin(4a - 2b) + \sin^2(4a - 2b) \end{bmatrix}$$

$$\bar{P}_{TR} \approx \frac{P_o}{4} \begin{bmatrix} 4\cos^2(2a - 2b) + \cos^2(4a - 2b) - 2\cos 2b\cos(4a - 2b) + \cos^2 2b \\ \sin^2 2b - 2\sin 2b\sin(4a - 2b) + \sin^2(4a - 2b) \end{bmatrix}$$

It is noted that beam $\bar{P}_{TR}$ has a P-polarized power component, $\bar{P}_{TRP}$, and an S-polarized power component, $\bar{P}_{TRS}$, as follows:

$$\bar{P}_{TRP} \approx \frac{P_o}{4}[4\cos^2(2a - 2b) + \cos^2(4a - 2b) - 2\cos 2b\cos(4a - 2b) + \cos^2 2b] \quad (7)$$

$$\bar{P}_{TRS} \approx \frac{P_o}{4}[\sin^2 2b - 2\sin 2b\sin(4a - 2b) + \sin^2(4a - 2b)] \quad (8)$$

As noted above, the target-reflected return beam represented as $P_{TR}$ is incident on Brewster plate 14 at the Brewster angle. Thus, substantially all of P-polarized component $\bar{P}_{TRP}$ of such beam couples through Brewster plate 14 and into laser 12 along optical path 34. Brewster plate 14 reflects S-polarized component $\bar{P}_{TRS}$ to optical detector 22, via optical path 40, where such S-polarized component is heterodyned with the LO beam, $\bar{P}_{LO}$, to produce an electrical target doppler signal. The target doppler signal is fed to utilization device 24 for amplification, filtering and processing.

Since reflected return signals from targets such as target T are relatively weak, it is apparent that for efficient interferometer operation, such signals must be coupled to optical detector 22 with as little loss as possible in the interferometer. It follows, therefore, that rotation angle "b" of second quarter-waveplate 18 is adjusted to maximize the S-polarized power component, $\bar{P}_{TRS}$, of target-reflected return beam $\bar{P}_{TR}$, since Brewster plate 14 reflects essentially only S-polarized components to optical detector 22. From Equation 5, it is seen that the S-polarized component of $\bar{E}_{TR}$ is:

$$\bar{E}_{TRS} = \frac{-E_o}{2}[i\sin 2b - i\sin(4a - 2b)] \quad (9)$$

By taking the first derivative of Equation 9 with respect to "b" and setting such derivative equal to zero, the minima and maxima of the S-polarization component, $\bar{E}_{TRS}$, are found to exist where:

$$\tan 2b = \frac{-(1 + \cos 4a)}{\sin 4a} \quad (10)$$

Therefore, by inserting into Equation 10 the rotation angle "a" obtained from Equation 4a for optimum LO power, rotation angle "b" can be calculated and second quarter-waveplate 18 rotated thereto to maximize the power of the target-reflected return beam illuminating optical detector 22. Optimum interferometer sensitivity and efficiency is thereby achieved.

In the interferometer of the preferred embodiment, laser 12 emits a beam having a power $P_o$ of 5 Watts (W). Brewster windows 25, 27 are selected to provide such beam with a P-polarization purity of >1000:1. Brewster plate 14 provides an S/P discrimination ratio of about 100:1, thus coupling essentially the full 5 W of beam power therethrough to optical path 38. As stated, front face 21 of beamsplitter 20 has a reflectivity, R=0.001. Here, optical detector 22 has an optimum LO (optical bias) power of 0.5 mW. As discussed, the optimum optical bias power typically differs from detector to detector. In practice, the first step is to set LO beam power to the optimum level for the optical detector used. From Equation 2 it is seen that the power, $\bar{P}_{BR}$, of the beam reflected by beamsplitter 20 and incident on second surface 15 of Brewster plate 14 is:

$$\bar{P}_{BR} \approx 5\text{mW} \begin{bmatrix} \cos^2 2a \\ \sin^2 2a \end{bmatrix}$$

Equation 4 reveals that, theoretically, LO beam power $\bar{P}_{LO}$ is (5 mW)sin² 2a; however, since Brewster plate 14 has a finite S/P discrimination ratio of, here, 100:1, it is seen that 1% of the P-polarized component (cos² 2a) of $\bar{P}_{BR}$ is reflected by Brewster plate 14 along optical path 40. Hence, the actual LO power delivered to optical detector 22 is:

$P_{LO}' = P_{BRS} + (0.01)P_{BRP}$ $P_{LO}' = (5 \text{ mW})\sin^2 2a + (0.01)(5 \text{ mW})\cos^2 2a$ (11)

$0.5 \text{ mW} = (5 \text{ mW})\sin^2 2a + (0.05 \text{ mW})\cos^2 2a$

Thus, it is seen that first quarter-waveplate 16 rotation angle "a" must be set to approximately 9° to achieve a total LO power of 0.5 mW. In system operation, first quarter-waveplate 16 is rotated to a 9° rotation angle and LO beam power is observed at optical detector 22. The rotation of first quarter-waveplate 16 is slightly adjusted, if necessary, to obtain precisely 0.5 mW of LO beam power. Unfortunately, Equation 11 shows that the LO beam includes a P-polarization power component of 0.045 mW, introducing about 0.4 dB of noise at optical detector 22. However, this slight noise presence is more than offset by the increase in detector efficiency resulting from decreasing the LO power from 5 mW ($P_o$xR) to 0.5 mW—the optimum operating power for this detector.

Having set first quarter-waveplate 16 to achieve the optimum LO beam power for optical detector 22, second quarter-waveplate 18 is rotated to its proper rotation angle. That is, second quarter-waveplate 18 is rotated to transmit to target T a beam which is substantially circularly polarized. In operation, this is done simply by adjusting the rotation of second quarter-waveplate 18 to maximize the power of the target-reflected return beam illuminating optical detector 22. To put it another way, second quarter-waveplate 18 is rotated to peak the S-polarized component of the target-reflected return beam incident on Brewster plate 14, thus implying that the beam transmitted to target T is maximally circularly polarized. Rotation angle "b" may be calculated simply by using Equation 10 with the rotation angle a obtained from Equation 11. In the system of the preferred embodiment, with a=9°, rotation angle "b" must be approximately 143°. Inserting the calculated values of "a" and "b" into Equation 6, the target-reflected return beam incident on Brewster plate 14 is:

$$\bar{P}_{TR} \approx \frac{P_o}{4} \begin{bmatrix} .386 \\ 3.614 \end{bmatrix} = P_o \begin{bmatrix} .097 \\ .903 \end{bmatrix} \quad (12)$$

Thus, such beam is not fully S-polarized; rather, a small (0.097) relative P-polarization component is present. This implies that the polarization of the beam transmitted to target T is not completely circular, but is instead slightly elliptical. Such P-polarization component is coupled by Brewster plate 14 along optical path 34 into laser 12, resulting in a slight (0.45 dB) loss of power as compared with a system that transmits a fully circularly-polarized beam to target T. This loss of return beam power, when taken with the 0.4 dB LO beam P-polarization noise, yields a total loss of less than 1 dB as a result of the rotation of first and second quarter-waveplates 16, 18.

Having described a preferred embodiment of the present invention, numerous modifications may become apparent to those skilled in the art without departing from the spirit of the invention. For example, the invention is not restricted to the use of quarter-waveplates to change the polarization state of a beam of energy; rather, other elements which alter the polarization state of an incident beam of energy may be substituted therefor. Also, laser cell 25 need not be a $CO_2$ laser and may also be a pulsed, rather than a CW, device. Additionally, laser power is not limited to 5 W, nor is beamsplitter reflectivity limited to 0.001. Further, the concepts described need not be applied to a heterodyne interferometer; rather, the invention may be employed in any Fizeau-type interferometer in which it is desirable to vary the power of the reference beam (described above as the LO beam) with respect to the power of the target beam in order to vary the degree of interference between the two beams. Accordingly, it is understood that the invention is to be limited only by the scope of the appended claims.

What is claimed is:
1. In combination:
   means for producing a beam of energy along a predetermined path;
   means, disposed in the predetermined path, for transmitting a first portion of the produced beam to a target and reflecting a second portion of the produced beam; and
   means, including the transmitting and reflecting means, for directing a target-reflected portion of the transmitted first beam portion and the reflected second beam portion to a detector along a common path, said directing means comprising means, disposed in the common path, for attenuating the reflected second beam portion along the common path and for coupling the target-reflected portion of the transmitted first beam portion along the common path with substantially no attenuation.
2. The combination of claim 1 wherein the directing means comprises:
   means for polarizing the reflected second beam portion as a pair of polarization components along the common path and for polarizing the target-reflected portion of the transmitted first beam portion as substantially only a second one of the pair of polarization components along the common path; and means for selectively coupling to the detector substantially only the second one of the pair of polarization components of the reflected second beam portion and the target-reflected portion of the transmitted first beam portion polarized as the second polarization component.

3. In an apparatus wherein a first portion of a beam of energy is transmitted along a first path to a target and a second portion of the beam is reflected to a detector along a common path with a target-reflected portion of the transmitted first beam portion returned to the apparatus, said apparatus comprising:
means, disposed in the common path, for attenuating the reflected second beam portion along the common path while coupling substantially all of the target-reflected return beam portion along the common path.

4. The apparatus of claim 3 wherein the attenuating means comprises:
means disposed along the common path for polarizing the reflected second beam portion as a pair of polarization components and for polarizing the target-reflected return beam portion as substantially only the second one of the pair of polarization components; and
means for selectively coupling substantially only the second one of the pair of polarization components of the reflected second beam portion and the second one of the pair of polarization components of the target-reflected return beam portion to the detector.

5. In combination:
means for producing a beam of energy along a predetermined path;
first and second waveplates serially disposed with the beam producing means in the predetermined path;
a beamsplitter disposed in the predetermined path between the first and second waveplates; and
a polarization analyzer disposed in the predetermined path between the beam producing means and the first waveplate.

6. The combination of claim 5 wherein the produced beam is polarized and a first portion of the produced beam couples through the first waveplate, the beamsplitter and the second waveplate, and wherein the first waveplate changes the polarization of the beam coupled therethrough a first predetermined amount, and the second waveplate changes the polarization of the beam coupled therethrough a second predetermined amount.

7. The combination of claim 6 wherein the produced beam is P-polarized, and wherein the first waveplate and the second waveplate alter the polarization of the first portion of the produced beam coupled through the first waveplate, the beamsplitter and the second waveplate to substantially circular polarization.

8. The combination of claim 7 wherein:
a substantially circularly polarized return beam couples through the second waveplate, the beamsplitter and the first waveplate and is incident on the polarization analyzer, and wherein the second waveplate and the first waveplate alter the polarization of the return beam coupled through the second waveplate, the beamsplitter and the first waveplate to substantially S-polarization.

9. The combination of claim 8 wherein the polarization analyzer directs to a detector substantially the entire S-polarized return beam incident thereon.

10. The combination of claim 6 wherein the produced beam is P-polarized and a second portion of the produced beam couples through the first waveplate, reflects from the beamsplitter, recouples through the first waveplate and is incident on the polarization analyzer, the first waveplate changing the polarization of the second beam portion incident on the polarization analyzer to both P- and S-polarization components.

11. The combination of claim 10 wherein the polarization analyzer directs to a detector substantially only the S-polarization component of the second beam portion incident on the polarization analyzer.

12. A method of transmitting a circularly polarized beam of energy to a target comprising the steps of:
producing a P-polarized beam of energy and directing such beam along a predetermined path;
changing the polarization of the beam a first predetermined amount to produce an elliptically polarized intermediate beam having S- and P-polarization components;
coupling a portion of the elliptically polarized intermediate beam to a detector;
changing the polarized of the intermediate beam a second predetermined amount to produce a circularly polarized beam; and
transmitting the circularly polarized beam to the target.

13. The method of claim 12 wherein thecoupling step comprises the steps of:
changing the polarization of the intermediate beam by the first predetermined amount to produce a reference beam having S- and P-polarization components; and
directing substantially only the S-polarized component of the reference beam to the detector.

14. The method of claim 13 comprising the additional steps of:
changing the polarization of the substantially circularly polarized beam reflected by the target by the first and second predetermined amounts to produce a substantially entirely S-polarized beam; and
directing substantially only the S-polarized component of such substantially entirely S-polarized beam to the detector.

15. The method of claim 14 comprising the additional steps of:
varying the power of the reference beam directed to the detector by varying the first predetermined amount of polarization change; and
varying the second predetermined amount of polarization change in response to the varying of the first predetermined amount of polarization change to produce a substantially circularly polarized beam for transmission to the target.

* * * * *